(12) United States Patent
Lee et al.

(10) Patent No.: US 11,056,740 B2
(45) Date of Patent: Jul. 6, 2021

(54) BATTERY CASE, BATTERY, AND METHOD FOR FABRICATING A BATTERY

(71) Applicant: Samsung Electronics Co., Ltd., Suwon-si (KR)

(72) Inventors: Moo Ho Lee, Suwon-si (KR); Moon Il Jung, Suwon-si (KR); In Kim, Suwon-si (KR); In Su Lee, Hwaseong-si (KR); Junghoon Lee, Seongnam-si (KR); Hye Jeong Lee, Suwon-si (KR); Song Won Hyun, Yongin-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 117 days.

(21) Appl. No.: 16/298,229

(22) Filed: Mar. 11, 2019

(65) Prior Publication Data
US 2019/0280255 A1 Sep. 12, 2019

(30) Foreign Application Priority Data
Mar. 9, 2018 (KR) .......................... 10-2018-0028283

(51) Int. Cl.
*H01M 50/116* (2021.01)
*H01M 10/0525* (2010.01)
(Continued)

(52) U.S. Cl.
CPC ........... *H01M 50/116* (2021.01); *B32B 27/08* (2013.01); *B32B 27/32* (2013.01);
(Continued)

(58) Field of Classification Search
CPC ............. H01M 2/0295; H01M 2/0277; H01M 2/0439; H01M 2/0482; H01M 2/1077;
(Continued)

(56) References Cited

U.S. PATENT DOCUMENTS

| | | |
|---|---|---|
| 4,719,159 A | 1/1988 | Clark et al. |
| 5,527,641 A | 6/1996 | Koshiishi et al. |
| | (Continued) | |

FOREIGN PATENT DOCUMENTS

| | | |
|---|---|---|
| JP | 10139998 A | 5/1998 |
| JP | H11191400 A | 7/1999 |
| | (Continued) | |

OTHER PUBLICATIONS

BYK Additives & Instruments, "BYK-P 4102 Data Sheet", Aug. 2015, BYK (Year: 2015).*

(Continued)

*Primary Examiner* — Jimmy Vo
(74) *Attorney, Agent, or Firm* — Cantor Colburn LLP

(57) ABSTRACT

A battery case including a container configured to house an electrode assembly, wherein the container includes a bottom wall and a plurality of side walls, the bottom wall and the side walls integrated to define a space for housing the electrode assembly and an open side opposed to the bottom wall, the container includes a composite including a polymer matrix, an inorganic moisture absorbent dispersed in the base polymer, and a compatibilizer to promote compatibility between the polymer matrix and the inorganic moisture absorbent, the compatibilizer is included in an amount of less than about 3 wt % based on a total weight of the composite, at least one of the bottom wall and the side walls at a thickness of 1 millimeter has a water vapor transmission rate of less than about 0.07 g/m²/day, when measured at 38° C. and a relative humidity of 100%.

16 Claims, 4 Drawing Sheets

(51) Int. Cl.
  *B32B 27/08* (2006.01)
  *B32B 27/32* (2006.01)
  *H01M 50/20* (2021.01)
  *H01M 50/24* (2021.01)
  *H01M 50/155* (2021.01)
  *H01M 50/166* (2021.01)

(52) U.S. Cl.
  CPC ..... *H01M 10/0525* (2013.01); *H01M 50/155* (2021.01); *H01M 50/166* (2021.01); *H01M 50/20* (2021.01); *H01M 50/24* (2021.01); *B32B 2439/62* (2013.01); *B32B 2457/10* (2013.01)

(58) Field of Classification Search
  CPC ........... H01M 2/1094; H01M 10/0525; H01M 50/116; H01M 50/24; H01M 50/20; H01M 50/155; H01M 50/166
  See application file for complete search history.

(56) References Cited

U.S. PATENT DOCUMENTS

| | | |
|---|---|---|
| 6,451,474 B1 | 9/2002 | Kozu et al. |
| 7,294,431 B2 | 11/2007 | Puttaiah et al. |
| 7,300,500 B2 | 11/2007 | Okada et al. |
| 7,460,808 B2 | 12/2008 | Okada |
| 7,744,778 B2 | 6/2010 | Lee et al. |
| 7,901,991 B2 | 3/2011 | Bonucci et al. |
| 8,304,473 B2 | 11/2012 | Yang et al. |
| 8,460,808 B2 | 6/2013 | Toia et al. |
| 8,461,662 B2 | 6/2013 | Lee et al. |
| 8,524,115 B2 | 9/2013 | Solovyov et al. |
| 8,828,591 B2 | 9/2014 | Hatta et al. |
| 8,853,124 B2 | 10/2014 | Incorvia et al. |
| 9,343,717 B2 | 5/2016 | Gless et al. |
| 9,419,315 B2 | 8/2016 | Tyler et al. |
| 9,595,626 B2 | 3/2017 | Bonucci et al. |
| 10,449,521 B2 | 10/2019 | Cho et al. |
| 2005/0233206 A1 | 10/2005 | Puttaiah et al. |
| 2013/0209878 A1* | 8/2013 | Nakahara .......... H01M 10/0525 429/211 |
| 2013/0323573 A1* | 12/2013 | Tanaka .................. H01M 2/024 429/154 |
| 2014/0342204 A1 | 11/2014 | Hatta et al. |
| 2015/0372263 A1* | 12/2015 | Douke .................... B32B 15/08 429/176 |
| 2016/0211490 A1* | 7/2016 | Hashimoto ............. B32B 27/40 |
| 2018/0269434 A1 | 9/2018 | Yu et al. |

FOREIGN PATENT DOCUMENTS

| | | |
|---|---|---|
| JP | 2003320215 A | 11/2003 |
| JP | 2003323916 A | 11/2003 |
| JP | 2004296174 A | 10/2004 |
| JP | 2006103761 A | 4/2006 |
| JP | 2010182427 A | 8/2010 |
| JP | 4755312 B2 | 8/2011 |
| JP | 5092457 B2 | 9/2012 |
| JP | 5045002 B2 | 10/2012 |
| JP | 2013100537 A | 5/2013 |
| JP | 5364694 B2 | 12/2013 |
| KR | 19980052532 A | 9/1998 |
| KR | 100443269 B1 | 7/2004 |
| KR | 0922490 B1 | 10/2009 |
| KR | 1020100071634 A | 6/2010 |
| KR | 1067755 B1 | 9/2011 |
| KR | 1020120021436 A | 3/2012 |
| KR | 101143300 B1 | 4/2012 |
| KR | 1020120074063 A | 7/2012 |
| KR | 1218215 B1 | 1/2013 |
| KR | 1020130028281 A | 9/2013 |
| KR | 1020140061146 A | 5/2014 |
| KR | 101522638 B1 | 5/2015 |
| KR | 1020150058825 A | 5/2015 |
| KR | 1020160017449 A | 2/2016 |
| KR | 1020150138457 A | 3/2016 |
| KR | 1020160116906 A | 10/2016 |
| KR | 1722544 B1 | 4/2017 |
| KR | 1020150037332 A | 6/2017 |
| KR | 1020170065883 A | 6/2017 |

OTHER PUBLICATIONS

Amit Saxenaa, et al., "Moisture barrier properties of xylan composite films," Carbohydrate Polymers, Jan. 28, 2011, vol. 84, pp. 1371-1377.

Ankush A.Gokhale, et al., "Recent advances in the fabrication of nanostructured barrier films," Journal of Nanoscience and Nanotechnology, 2014, vol. 14, pp. 2157-2177.

Byung Min Yoo, et al., "Graphene and Graphene Oxide and Their Uses in Barrier Polymers," Journal of Applied Polymer Science, 2013, DOI: 10.1002/app.39628, pp. 1-23.

Changsoo Jang, et al., "Comprehensive Moisture Diffusion Characteristics of Epoxy Molding Compounds over Solder Reflow Process Temperature," IEEE Transactions on Components and Packaging Technologies, Dec. 2010, vol. 33, No. 4, pp. 809-818.

Chien-Sheng Wu, et al., "Flexible and transparent moisture getter film containing zeolite," Adsorption, Oct. 22, 2009, vol. 16, DOI: 10.1007/s10450-009-9196-3,pp. 69-74.

E.H. Wong, et al., "Moisture absorption and diffusion characterisation of packaging materials—advanced treatment," Microelectronics Reliability, 2003, vol. 43, pp. 2087-2096.

E.H. Wong, et al., "Non-Fickian Moisture Properties Characterisation and Diffusion Modeling for Electronic Packages," 1999 Electronic Components and Technology Conference, 1999, pp. 302-306.

European Search Report for European Patent Application No. 18211929.7 dated Mar. 22, 2019.

G. Choudalakis, et al., "Permeability of polymer/clay nanocomposites: A review," European Polymer Journal, Jan. 30, 2009, vol. 45,pp. 967-984.

Hong-Liang, Lu et al., "Investigation of Thermal Stability of Atomic-Layer-Deposited MgO Thin Films on Si(100) Using X-Ray Photoelectron Spectroscopy," Electrochemical and Solid-State Letters, Dec. 17, 2009, vol. 13, Issue 3, pp. G25-G28.

Hongrae Jeon, et al., "Improved Specific Capacitance of Amorphous Vanadium Pentoxide in a Nanoporous Alumina Template," Electrochemical and Solid-State Letters, Jan. 4, 2010, vol. 13, Issue 3, pp. A25-A28.

I. Sushumna, et al., "Stable, highly concentrated suspensions for electronic and ceramic materials applications," Journal of Materials Research, Jan. 31, 2011, vol. 6, Issue 5, DOI: https://doi.org/10.1557/JMR.1991.1082, pp. 1082-1093.

Jitendra Pal Singh, et al., "Synthesis and Characterization of Some Alkaline-Earth-Oxide Nanoparticles," Journal of the Korean Physical Society, Apr. 2018, vol. 72, No. 8,pp. 890-899.

Jungmo Kim, et al., "Moisture Barrier Composites Made of Non-Oxidized Graphene Flakes," Communication, Feb. 26, 2015, vol. 11, No. 26, pp. 3124-3129.

Karol Pietrak, et al., "A review of models for effective thermal conductivity of composite materials," Journal of Power Technologies, 2015, vol. 95, Issue 1,pp. 14-24.

Kominami Hiroshi, et al., "Correlation between some physical properties of titanium dioxide particles and their photocatalytic activity for some probe reactions in aqueous systems," Journal of physical chemistry, 2002, vol. 106, Issue 40, pp. 10501-10507.

Kwong-Yu Chan,et al., "Supported mixed metal nanoparticles as electrocatalysts in low temperature fuel cells," Journal of Materials Chemistry, Jan. 23, 2004, vol. 14, pp. 505-516.

Lawrence E. Nielsen, "Models for the Permeability of Filled Polymer Systems," Journal of Macromolecular Science: Part A—Chemistry, 1967, Published online: Oct. 24, 2006, vol. 1,Issue 5, pp. 929-942.

Long-Hua Lee, et al., "High-Refractive-Index Thin Films Prepared from Trialkoxysilane-Capped Poly(methyl methacrylate)-Titania Materials," Chem. Mater., Feb. 17, 2001, vol. 13, pp. 1137-1142.

(56) References Cited

OTHER PUBLICATIONS

Michael Z. Hu, et al., "Semiconductor Nanocrystal Quantum Dot Synthesis Approaches Towards Large-Scale Industrial Production for Energy Applications," Nanoscale Research Letters, 2015, vol. 10, Issue 469, pp. 1-15.

Mostafa Yourdkhani, et al., "Thermal, oxygen barrier and mechanical properties of polylactide-organoclay nanocomposites," Composites Science and Technology, Mar. 28, 2013, vol. 82, pp. 47-53.

Non-Final Office Action dated Jun. 8, 2020 in U.S. Appl. No. 16/217,126.

Pradeep Kumar Raja, et al., "Highly Basic CaO Nanoparticles in Mesoporous Carbon Materials and Their Excellent Catalytic Activity," Journal of Nanoscience and Nanotechnology, Jun. 2012, vol. 12, pp. 4613-4620.

Randy De Palma, et al., "Silane Ligand Exchange to Make Hydrophobic Superparamagnetic Nanoparticles Water-Dispersible," Chem. Mater., 2007, vol. 19, pp. 1821-1831.

Robert Maixner, et al., "Testing Water Vapor Transmission Rates for Flexible Barrier Materials Including Metalized Structures," TAPPI 2002 PLACE Conference, 2002, pp. 1-5.

Shashank Arora, et al., "Review of mechanical design and strategic placement technique of a robust battery pack for electric vehicles," Renewable and Sustainable Energy Reviews, Mar. 18, 2016, vol. 60, pp. 1319-1331.

Wolfgang Brockner, et al., "Thermal decomposition of nickel nitrate hexahydrate, $Ni(NO_3)_2 \cdot 6H_2O$, in comparison to $Co(NO_3)_2 \cdot 6H_2O$ and $Ca(NO_3)_2 \cdot 4H_2O$," Thermochimica Acta, Feb. 3, 2007, vol. 456, pp. 64-68.

X. Hao, et al., "The control of platinum impregnation by PZC alteration of oxides and carbon," Journal of Molecular catalysis A: Chemical, Jun. 7, 2004, vol. 219, pp. 97-107.

Zhonglai Li, et al., "Preparation and characterization of ordered mesoporous carbons on SBA-15 template," Journal of Materials Chemistry, Jan. 20, 2006, vol. 16, pp. 1350-1354.

X.J. Fan, et al., "Experimental investigations and model study of moisture behaviors in polymeric materials," Microelectronics Reliability, Apr. 23, 2009, vol. 49, pp. 861-871.

\* cited by examiner

BATTERY CASE, BATTERY, AND METHOD FOR FABRICATING A BATTERY

CROSS-REFERENCE TO RELATED APPLICATION

This application claims priority to Korean Patent Application No. 10-2018-0028283 filed in the Korean Intellectual Property Office on Mar. 9, 2018, and all the benefits accruing therefrom under 35 U.S.C. § 119, the entire content of which are incorporated herein by reference.

BACKGROUND

1. Field

This disclosure relates to a battery case, a battery, and a method of fabricating a battery.

2. Description of the Related Art

As various kinds of mobile electronic devices and various means of electric transportation are developed, research on a power source (e.g., a battery) for supplying them with electricity (or motive power) is actively being performed. The battery may be housed in a case and disposed individually or as a module in these devices or means of transportation. Accordingly, there is a need for the development of technology capable of improving the properties of the case.

SUMMARY

An embodiment provides a battery case having improved moisture transmission resistivity and mechanical properties.

Another embodiment provides a battery including the battery case.

In an embodiment, a battery case includes a container configured to house an electrode assembly, wherein the container includes a bottom wall and a plurality of side walls, the bottom wall and the side walls are integrated to define a space for housing the electrode assembly and an open side opposed to the bottom wall, the container includes a composite including a polymer matrix, an inorganic moisture absorbent dispersed in the polymer matrix, and a compatibilizer to promote compatibility between the polymer matrix and the inorganic moisture absorbent, the compatibilizer is included in an amount of less than about 3 wt % based on a total weight of the composite, and at least one of the bottom wall and the side walls at a thickness of 1 millimeter has a water vapor transmission rate (WVTR) of less than or equal to about 0.07 g/m²/day, when measured at 38° C. and a relative humidity of 100% according to ISO 15106 or ASTM F1249.

The container may include a partition wall extending from a first side wall to a second side wall.

The battery case may further include a lid configured to cover at least a part of the open side of the container and having at least one of a positive terminal and a negative terminal.

The lid may include the composite.

The polymer matrix may include a polycarbonate, a polyethylene, a polypropylene, a polyvinyl chloride, a polyvinyl acetate, a polyvinyl alcohol, a polyacrylonitrile, a polyamide, a polyester, a polyphenylene sulfide (PPS), a polyphenylene ether, a polyphenylene oxide, a polystyrene, a polyamide, a polycyclic olefin copolymer, an acrylonitrile-butadiene-styrene copolymer, a liquid crystal polymer (LCP), a mixture thereof, an alloy thereof, a copolymer thereof, or a combination thereof.

The inorganic moisture absorbent may include silica gel, zeolite, CaO, BaO, $MgSO_4$, $Mg(ClO_4)_2$, MgO, $P_2O_5$, $Al_2O_3$, $CaH_2$, NaH, $LiAlH_4$, $CaSO_4$, $Na_2SO_4$, $CaCO_3$, $K_2CO_3$, $CaCl_2$, $Ba(ClO_4)_2$, Ca, or a combination thereof.

The compatibilizer may include a polymer having at least one functional group that reacts with the inorganic moisture absorbent to be bound thereto or has an adhesion force with the inorganic moisture absorbent.

The functional group may include a carboxyl group, a phosphate group, a phosphonate group a sulfonate group, a (meth)acrylate group, an acid anhydride group, an epoxy group, a glycidyl group, an oxazoline group, a hydroxyl group, an amine group, an amide group, a carbonyl group, an isocyanate group, an acyl group, a carbodiimide group, or a combination thereof.

The polymer having at least one functional group may include a polyolefin, a polystyrene, a polyester, or a thermoplastic elastomer, which has the functional group attached to an end thereof or grafted to a main chain of the polymer, a copolymer of at least one of the foregoing polymers and another polymer, or a combination thereof.

The compatibilizer may include a polymer or a copolymer comprising a carboxyl group, a phosphate group, a phosphonate group, a meth(acrylate) group, a maleic anhydride group, a glycidyl meth(acrylate) group, which is attached to an end thereof or grafted to the main chain of the polymer or copolymer, or a combination thereof.

The inorganic moisture absorbent may be included in an amount of less than or equal to about 20 wt % based on a total weight of the composite.

The compatibilizer may be included in an amount of less than or equal to about 2 wt % based on a total weight of the composite.

The polymer matrix may include a polyolefin or a liquid crystal polymer. The polyolefin may include a high density polyethylene.

The liquid crystal polymer may include a structural unit derived from an oligomer of hydroxybenzoic acid.

The composite may further include at least one fluorinated polymer including polytetrafluoroethylene (PTFE), polyvinylidene fluoride (PVDF), polychlorotrifluoroethylene (PCTFE), a mixture thereof, a copolymer thereof, or a combination thereof.

The inorganic moisture absorbent may include CaO, zeolite, or a mixture thereof.

In another embodiment, a battery includes the battery case and an electrode assembly including a positive electrode and a negative electrode housed in the container of the battery case.

The electrode assembly may not include a metal exterior material.

The electrode assembly may be an electrode assembly for a rechargeable lithium battery.

The battery case according to an embodiment may be easily fabricated to have a desired shape and a desired size by molding a composite including a polymer matrix, an inorganic moisture absorbent dispersed therein, and a compatibilizer for promoting compatibility between the polymer matrix and the inorganic moisture absorbent with a low cost, and then, a battery may be fabricated in a simple and fast process by separately preparing an electrode assembly and electrolyte, introducing the electrode, and injecting the electrolyte into the battery case. In addition, the battery case has a light weight, excellent moisture transmission resistivity, and excellent mechanical properties, such as, for example, impact strength. The battery case may be used to form a battery module for an electric vehicle, which includes a plurality of battery cells and supplies large capacity of electricity and the like.

DETAILED DESCRIPTION

Figure 1:
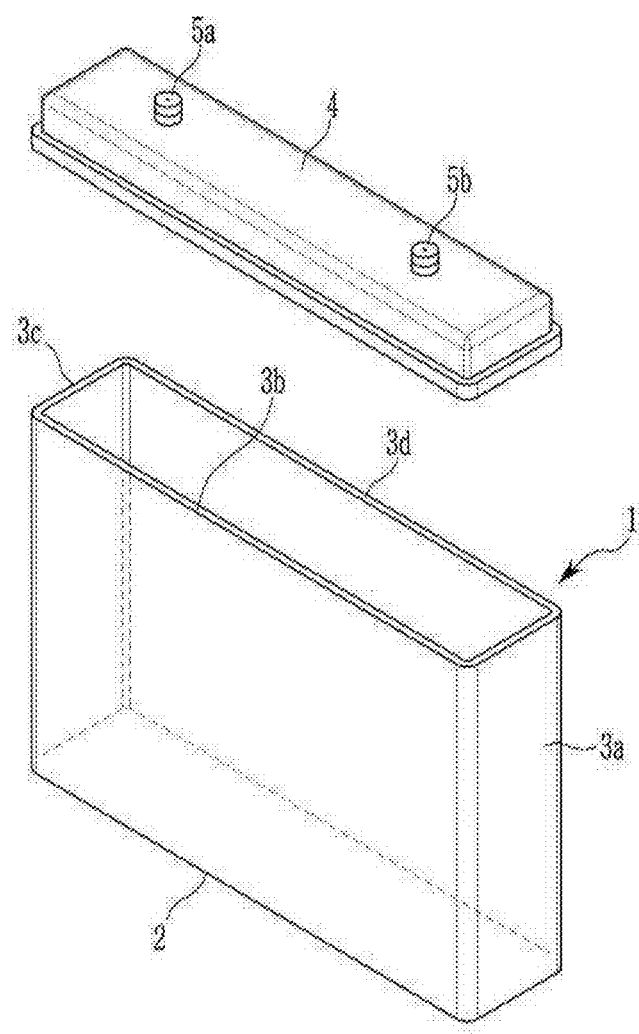
FIG. 1 is an exploded perspective view showing an exemplary embodiment of a battery case.

Advantages and characteristics of this disclosure, and a method for achieving the same, will become evident referring to the following example embodiments together with the drawings attached hereto. Hereinafter, embodiments of the present disclosure are described in detail. However, these embodiments are exemplary, the present disclosure is not limited thereto, and the embodiments should not be construed as being limited to the embodiments set forth herein. Unless defined otherwise, all terms (including technical and scientific terms) in the specification may be defined as commonly understood by one having ordinary skilled in the art. The terms defined in a generally-used dictionary may not be interpreted ideally or exaggeratedly unless clearly defined. In addition, unless explicitly described to the contrary, the word "comprise" and variations such as "comprises" or "comprising," will be understood to imply the inclusion of stated elements but not the exclusion of any other elements.

Further, the singular includes the plural unless mentioned otherwise.

In the drawings, the thickness of each element is exaggerated for better comprehension and ease of description. Like reference numerals designate like elements throughout the specification. It will be understood that when an element such as a layer, film, region, or plate is referred to as being "on" another element, it can be directly on the other element or intervening elements may also be present. In contrast, when an element is referred to as being "directly on" another element, there are no intervening elements present.

It will be understood that, although the terms "first," "second," "third," etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, "a first element," "component," "region," "layer," or "section" discussed below could be termed a second element, component, region, layer, or section without departing from the teachings herein. The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±10%, or 5% of the stated value. Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

A "carboxyl group" as used herein is a group of the formula —C(=O)OR wherein R is independently hydrogen, an organic substituent, or a counterion (e.g., a potassium or sodium ion).

An "organic substituent" as used herein is a group having carbon atoms and hydrogen atoms, for example from 1 to 30 carbon atoms, for example a C1-C30 alkyl, a C2-C30 alkenyl, a C2-C30 alkynyl, a C3-C30 cycloalkyl or a C6-C30 aryl group, optionally wherein a carbon atom may be replaced with a heteroatom, for example, nitrogen, oxygen, sulfur, or a combination thereof.

A "phosphate group" as used herein has the formula —O—P(O)(OR$_1$)(OR$_2$), wherein R$_1$ and R$_2$ is independently hydrogen, an organic substituent, or a counterion (e.g., a potassium or sodium ion).

A "phosphonate group" as used herein has the formula —P(O)(OR$_1$)(OR$_2$), wherein each R$_1$ and R$_2$ are independently hydrogen, an organic substituent, or a counterion (e.g., a potassium or sodium ion).

A "sulfonate group" as used herein has the formula —S(O)$_2$—O—R, wherein R is a hydrogen, an organic substituent, or a counterion (e.g., a potassium or sodium ion).

An "acid anhydride" as used herein has the formula —C(O)—O—C(O)—R, wherein R is an organic group.

An "epoxy group" as used herein has the formula

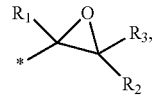

wherein the "*" refers to the point of attachment. Each of $R_1$ and $R_2$ is independently hydrogen or an organic substituent.

A "glycidyl group" as used herein has the formula

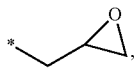

wherein the "*" refers to the point of attachment.

An "oxazoline group" as used herein has the formula

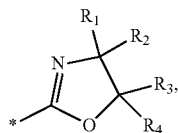

wherein the "*" refers to the point of attachment. Each of $R_1$, $R_2$, $R_3$, and $R_4$ is independently hydrogen or an organic substituent.

A "hydroxyl group" as used herein has the general formula —OH.

An "amine group" as used herein has the general formula —NRR, wherein each R is independently hydrogen or an organic substituent.

An "amide group" as used herein, has the formula —C(O)—N($R_x$)($R_y$) or —N($R_x$)—C(O)—$R_w$, wherein $R_w$ is an organic substituent; and each $R_x$, $R_y$, and $R_z$ is independently a hydrogen or an organic substituent.

A "carbonyl group" as used herein has the formula —C=O.

An "acyl group" as used herein has the formula —C(O)—R, wherein R is a hydrogen, an organic substituent, or a halide.

An "isocyanate group" as used herein has the formula —N=C=O.

A "(meth)acrylate" group as used herein is inclusive of an acrylate ($H_2C$=CH—C(=O)O—) group or a methacrylate group ($H_2C$=C($CH_3$)—C(=O)O—).

"A combination thereof" as used herein refers to a combination comprising at least one of the named constituents, components, compounds, or elements.

An electric vehicle (EV) uses at least one battery system to supply partial or full motive power. The electric vehicle discharges fewer pollutants as compared with a traditional vehicle operated by an internal combustion engine and can provide greater fuel efficiency. Some electric vehicles use no gasoline at all and obtain the entire motive power from electricity. Accordingly, there is a continuing need for an improved power source for electric vehicles, such as, for example, an improved battery or battery module.

A rechargeable lithium battery capable of being charged and discharged and having high energy density is desired for electric vehicles. Typically, t a conventional rechargeable lithium battery is operated at an increased temperature, has low moisture resistance, and thus mainly uses an aluminum material having excellent moisture transmission resistivity as a battery case. In other words, in conventional batteries, an electrode assembly including positive and negative electrodes is inserted into a case such as an aluminum pouch and the pouch is sealed to make a battery cell; a plurality of battery cells is used to form a battery module. However, since this method requires a complicated assembly process, a large amount of fabrication time, and a high cost, its productivity needs to be improved. In addition, since a battery case made from a conventional metal has a limited shape due to a limit in terms of a metal manufacturing technology, a battery case having a desired shape and/or size requires a multistep process, a high cost, and a large amount of fabrication time. In addition, when the metal case has a large size, due to a weight of a metal itself, or when a plurality of containers is included in order to house a plurality of battery cells, the battery case becomes heavier and drives costs much higher.

Accordingly, there are needs for a battery case and a battery or battery module that is capable of solving the problems of heat management, moisture transmission, and the like, and may easily be fabricated into desirable shapes and sizes with a low manufacturing cost. For example, research is needed to realize a cell-module integration structure without needing to fabricate a separate battery cell after forming an electrode assembly, without sacrificing mechanical strength, moisture transmission resistivity, and the like.

The present inventors developed a battery case and a battery including the same by using a polymer which is light, inexpensive, and easily moldable to provide a desired size and a desired shape, with improved properties, in particular, a low water vapor transmission rate of less than about 0.07 gram/(meter)$^2$/day, substantially improved moisture transmission resistivity, and in addition, excellent mechanical properties by dispersing an inorganic moisture absorbent and a small amount of a compatibilizer for promoting compatibility between a polymer matrix and the inorganic moisture absorbent in the polymer matrix.

That is, a battery case includes a container for housing an electrode assembly, wherein the container includes a composite including a polymer matrix, an inorganic moisture absorbent dispersed in the polymer matrix, and a compatibilizer to promote compatibility between the polymer matrix and the inorganic moisture absorbent, wherein the compatibilizer is included in an amount of less than about 3 wt % based on a total weight of the composite, the container includes a bottom wall and a plurality of side walls, the bottom wall and the side walls are integrated to define a space for housing the electrode assembly and an open side opposed to the bottom wall, at least one of the bottom wall and the side walls having a thickness of 1 mm has a water vapor transmission rate (WVTR) of less than or equal to about 0.07 g/m$^2$/day, when measured at 38° C. and a relative humidity of 100% according to ISO 15106 or ASTM F1249.

In an exemplary embodiment, all of the bottom wall and the side walls of the container of the battery case having a thickness of 1 mm have a water vapor transmission rate (WVTR) of less than or equal to about 0.07 g/m$^2$/day, when measured at 38° C. and a relative humidity of 100% according to ISO 15106 or ASTM F1249. For example, the container itself may has a water vapor transmission rate (WVTR) of less than or equal to about 0.07 g/m$^2$/day, when measured at 38° C. and a relative humidity of 100% according to ISO 15106 or ASTM F1249, provided that a thickness of all of the bottom wall and the side walls defining a container is 1 mm.

The battery case according to an embodiment, e.g., at least one of the bottom wall and the side walls of the container of the case according to an embodiment, or in an exemplary embodiment all the bottom wall and the side walls of the container of the case according to an embodiment, includes a composite including a polymer matrix, as a substrate, an inorganic moisture absorbent, and a compatibilizer promoting compatibility between the polymer matrix and the inorganic moisture absorbent, dispersed in the polymer matrix. Without being bound by theory, as an adhesion force between the polymer matrix and the inorganic moisture absorbent is increased due to the compatibilizer, the inorganic moisture absorbent is much better dispersed in the polymer matrix, and the battery case may show improved moisture transmission resistivity and mechanical properties, for example, a high impact strength.

In order to increase thermal conductivity or mechanical properties of a polymer, conventional methods of dispersing an inorganic filler in the polymer and molding the mixture into a battery case may be adopted, but the inorganic filler may not be well dispersed in the polymer but may agglomerate due to a characteristic difference between the polymer and the inorganic filler. Accordingly, using conventional methods, even though the inorganic filler is included in the polymer, mechanical properties may not be significantly improved, and in addition, since an amount of the inorganic filler is limited, the mechanical properties may not be improved in proportion to the increased amount of the inorganic filler but rather worsened.

However, since the battery case according to an embodiment includes a polymer matrix, an inorganic moisture absorbent, and, in addition, a compatibilizer for promoting compatibility therebetween, the inorganic moisture absorbent may be uniformly dispersed in the polymer matrix, and thus mechanical characteristics, for example, an impact strength, as well as a moisture transmission resistivity, may be substantially improved.

Figure 3:
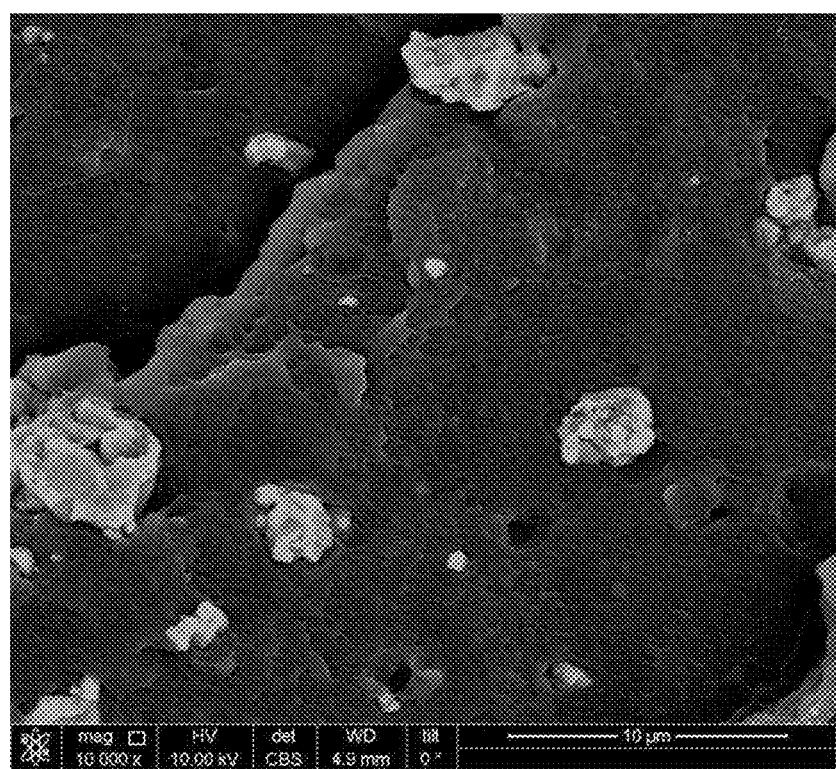
FIG. 3 is a scanning electron microscope (SEM) image showing an exemplary embodiment of an article formed by injection-molding a composite including 90 wt % of high density polyethylene (HDPE), and 10 wt % of calcium oxide (CaO) as an inorganic moisture absorbent.
Figure 4:
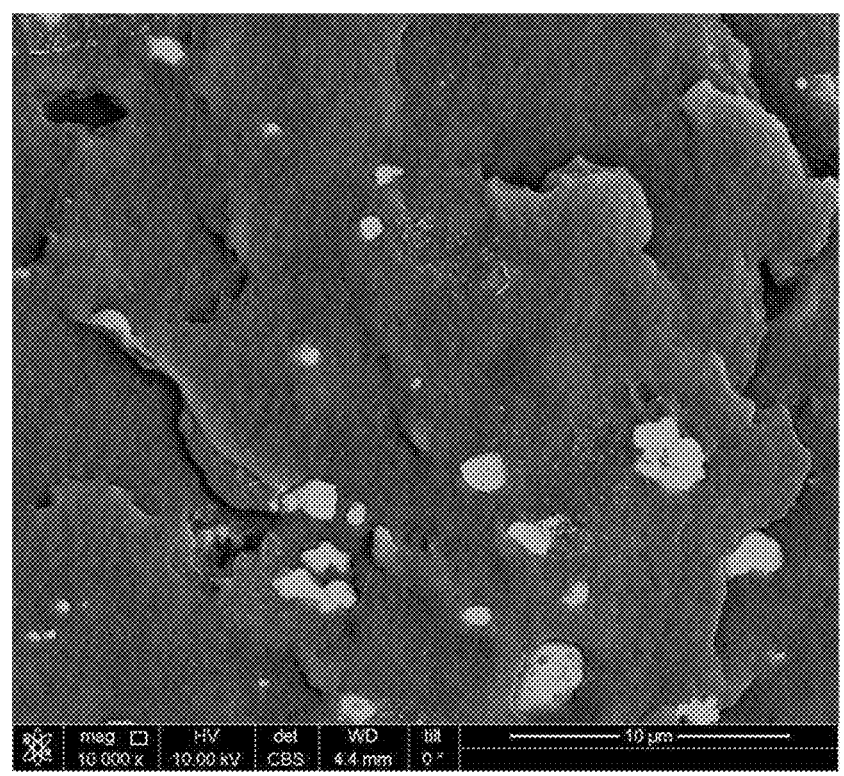
FIG. 4 is a scanning electron microscope (SEM) image showing an exemplary embodiment of an article formed by injection-molding a composite including 89.5 wt % of high density polyethylene (HDPE), 10 wt % of calcium oxide (CaO) as an inorganic moisture absorbent, and 0.5 wt % of carboxyl group-containing copolymer BYK-P4102 as a compatibilizer.

For example, referring to FIGS. 3 and 4, FIG. 3 is a SEM image showing an exemplary embodiment of an article molded by including 10 wt % of calcium oxide (CaO) as an inorganic moisture absorbent in 90 wt % of high density polyethylene (HDPE), and FIG. 4 is a SEM image showing an exemplary embodiment of an article molded by including 10 wt % of calcium oxide (CaO) as an inorganic moisture absorbent and 0.5 wt % of a copolymer including a carboxyl group, BYK-P4102, as a compatibilizer for promoting compatibility between HDPE and CaO in 85.5 wt % of high density polyethylene (HDPE).

As shown in FIG. 3, as for the exemplary embodiment of the article including HDPE and CaO without a compatibilizer, CaO particles are largely agglomerated, and a void between the agglomerated CaO particles and the HDPE matrix is present. On the other hand, in FIG. 4, compared with FIG. 3, the CaO particles have a much smaller size and are relatively uniformly dispersed in the HDPE matrix, and a void between the CaO particles and the HDPE matrix is substantially minimized. In other words, comparing an article prepared from a polymer matrix and an inorganic moisture absorbent alone with an article prepared from a polymer matrix and an inorganic moisture absorbent, along with the compatibilizer promoting compatibility there between, the compatibilizer suppresses agglomeration of the inorganic moisture absorbent in the polymer matrix and promotes its dispersion, and accordingly, even though the inorganic moisture absorbent is included in an equal amount, moisture transmission resistivity and mechanical properties of the article may be substantially improved.

Accordingly, the battery case according to an embodiment may be formed by molding a composite including a polymer matrix as a substrate, an inorganic moisture absorbent, and less than about 3 wt % of a compatibilizer for promoting compatibility between the polymer matrix and the inorganic moisture absorbent based on a total weight of the composite, and thus have a water vapor transmission rate reduced down to less than or equal to about 0.07 g/m$^2$/day, for example, less than or equal to about 0.06 g/m$^2$/day, less than or equal to about 0.05 g/m$^2$/day, less than or equal to about 0.04 g/m$^2$/day, less than or equal to about 0.03 g/m$^2$/day, less than or equal to about 0.025 g/m$^2$/day, less than or equal to about 0.02 g/m$^2$/day, less than or equal to about 0.015 g/m$^2$/day, or less than or equal to about 0.01 g/m$^2$/day, but is not limited thereto.

In addition, the battery case may have an impact strength of greater than or equal to about 20 kJ/m$^2$, for example, greater than or equal to about 21 kJ/m$^2$, greater than or equal to about 22 kJ/m$^2$, greater than or equal to about 23 kJ/m$^2$, greater than or equal to about 24 kJ/m$^2$, greater than or equal to about 25 kJ/m$^2$, greater than or equal to about 26 kJ/m$^2$, greater than or equal to about 27 kJ/m$^2$, greater than or equal to about 28 kJ/m$^2$, greater than or equal to about 29 kJ/m$^2$, greater than or equal to about 30 kJ/m$^2$, greater than or equal to about 33 kJ/m$^2$, greater than or equal to about 35 kJ/m$^2$, greater than or equal to about 37 kJ/m$^2$, greater than or equal to about 40 kJ/m$^2$, greater than or equal to about 41 kJ/m$^2$, greater than or equal to about 42 kJ/m$^2$, greater than or equal to about 43 kJ/m$^2$, greater than or equal to about 44 kJ/m$^2$, or greater than or equal to about 45 kJ/m$^2$ but is not limited thereto.

In other words, the battery case according to an embodiment may easily have desired moisture transmission resistivity and impact strength by adjusting the kind and the amount of the polymer matrix, the inorganic moisture absorbent, and the compatibilizer.

The above moisture transmission resistivity of the battery case according to an embodiment is similar to that of a conventional metal pouch exterior wrapping of an electrode assembly for a rechargeable lithium battery, and in addition, the battery case maintains sufficiently excellent mechanical properties, such as, for example, impact strength. Accordingly, the battery case according to an embodiment is used to fabricate a battery by separately forming an electrode assembly and directly inserting it without wrapping it with an additional exterior, such as, a metal pouch, and the like, into a container having a space for accepting the electrode assembly.

In an exemplary embodiment, the container may include a plurality of cell compartments partitioned by at least one partition wall disposed in the space, and accordingly, a battery module including the plurality of battery cells may be simply fabricated by forming a plurality of electrode assemblies and directly inserting each of them into the each of the plurality of cell compartments in the battery container without wrapping the electrode assemblies with a metal pouch and the like. In other words, the battery case according to an embodiment may provide a cell-module integration battery case.

Conventionally, an electrode assembly including a positive and a negative electrode is formed, wrapped with a metal pouch having moisture transmission resistivity to form a battery cell, and then, packed in a metallic battery case to fabricate a battery module, which is a complicated time-consuming, and expensive process. As described above, the battery case according to an embodiment may be easily fabricated into one cell-module integrated unit and have an effect of sharply reducing time and cost during a fabrication of the battery module compared with a conventional metal battery case. In addition, the battery case according to an embodiment includes a polymer material as a main component and thus has a light weight, shape freedom, and a low manufacturing cost.

The composite for forming the battery case according to an embodiment may include a polycarbonate, a polyethylene, a polypropylene, a polyvinyl a chloride, a polyvinyl acetate, a polyvinyl alcohol, a polyacrylonitrile, a polyamide, a polyester, a polyphenylene sulfide (PPS), a polyphenylene ether, a polyphenylene oxide, a polystyrene, polyamide, a polycyclic olefin copolymer, an acrylonitrile-butadiene-styrene copolymer, a liquid crystal polymer (LCP), a mixture thereof, an alloy thereof, a copolymer thereof, or a combination thereof as the polymer matrix, but is not limited thereto.

In an exemplary embodiment, the composite may include a polyolefin or a liquid crystal polymer as the polymer matrix, and the polyolefin may include a high density polyethylene (HDPE) and the liquid crystal polymer may include a structural unit derived from an oligomer of hydroxybenzoic acid.

In an exemplary embodiment, the liquid crystal polymer may be a copolymer prepared by copolymerizing at least two of HNA (2,6-hydroxynaphthoic acid), TPA (terephthalic acid), IPA (isophthalic acid), HQ (hydroquinone), BP (biphenol), PET (polyethylene terephthalate), and PEN (polyethylene naphthalate), with the oligomer of hydroxybenzoic acid (HBA). In an exemplary embodiment, the polymer matrix may include a copolymer prepared by copolymerizing greater than or equal to about 40 mol % of an oligomer of hydroxybenzoic acid and less than or equal to about 60 mol % of the at least two of the above.

The high density polyethylene or the liquid crystal polymer have a low water vapor transmission rate, and thereby moisture transmission resistivity of the battery case may be improved.

The polymer matrix may be included in an amount of about 70 wt % to about 95 wt % based on a total weight of the composite.

The inorganic moisture absorbent may include at least one of silica gel, zeolite, CaO, BaO, MgSO$_4$, Mg(ClO$_4$)$_2$, MgO, P$_2$O$_5$, Al$_2$O$_3$, CaH$_2$, NaH, CaSO$_4$, Na$_2$SO$_4$, CaCO$_3$, K$_2$CO$_3$, CaCl$_2$, Ba(ClO$_4$)$_2$, and Ca.

In an exemplary embodiment, the inorganic moisture absorbent may include zeolite, CaO, or a combination thereof.

Zeolites having various pore sizes are commercially available, and when the battery case according to an embodiment includes a zeolite as an inorganic moisture absorbent, the zeolite having a pore size ranging from about 3 Angstroms (Å) to about 10 Å, for example, from about 3 Å to about 8 Å, from about 3 Å to about 7 Å, or from about 3 Å to about 5 Å may be used. Since a water molecule has a size of about 3.8 Å, the water molecule may be easily trapped in the pore of the zeolite. In addition, the zeolite may have an average particle diameter ranging from about 2 micrometers (μm) to about 10 μm and include aluminum in an amount of greater than or equal to about 40 wt %. When the amount of aluminum is greater than or equal to about 40 wt %, excellent hygroscopicity may be exhibited.

When the inorganic moisture absorbent is CaO, a particle size of CaO may be from about 0.1 μm to about 20 μm, for example, from about 0.1 μm to about 15 μm, from about 0.1 μm to about 10 μm, from about 0.1 μm to about 8 μm, from about 0.1 μm to about 7 μm, from about 0.1 μm to about 6 μm, from about 0.1 μm to about 5 μm, from about 0.1 μm to about 4 μm, from about 0.1 μm to about 3 μm, from about 0.1 μm to about 2 μm, or from about 0.1 μm to about 1 μm, but is not limited thereto. When CaO has a particle size of greater than about 20 μm, moisture transmission resistivity may tend to decrease.

Zeolite is a physical moisture absorbent absorbing water through a particle having a pore, while CaO is a chemical water absorbent absorbing water through a chemical reaction with a water molecule. Accordingly, in an exemplary embodiment, a water vapor transmission rate of the battery case may be substantially reduced by including zeolite and CaO as an inorganic moisture absorbent.

The inorganic moisture absorbent may be included in an amount of less than or equal to about 30 wt %, for example, less than or equal to about 25 wt %, less than or equal to about 20 wt %, for example, from about 5 wt % to about 20 wt %, for example, from about 5 wt % to about 18 wt %, for example, from about 5 wt % to about 15 wt %, for example, from about 5 wt % to about 13 wt %, for example, from about 5 wt % to about 12 wt %, for example, from about 7 wt % to about 25 wt %, for example, from about 7 wt % to about 20 wt %, or for example, from about 7 wt % to about 15 wt %, based on a total weight of the article, but is not limited thereto.

When an amount of the inorganic moisture absorbent is less than about 5 wt %, the inorganic moisture absorbent may not have a sufficient effect of improving moisture transmission resistivity, or a battery which is intended to be used for 10 years or longer may have a shorter absorption life-span due to the reduced moisture transmission resistivity. In addition, when an amount of the inorganic moisture absorbent is in an amount of greater than about 20 wt %, the inorganic moisture absorbent may be agglomerated and become hydrophilic on the surface, and thus this may deteriorate moisture transmission resistivity, as well as substantially deteriorate impact strength of the article and formability of the composite.

On the other hand, the compatibilizer to promote compatibility between the polymer matrix and the inorganic moisture absorbent may include any material capable of promoting compatibility, that is, an adhesion force, between the polymer matrix and the inorganic moisture absorbent, for example, a material having a functional group reacting with the inorganic moisture absorbent and thus adhered to the inorganic moisture absorbent or forming an adhesion force with the inorganic moisture absorbent by using a similar polymer to the polymer matrix. Herein, "the functional group forming an adhesion force with the inorganic moisture absorbent" may not be directly bound (e.g., covalently bound) with the inorganic moisture absorbent, but may form an adhesion force, such as, for example, a hydrogen bond, a Van der Waals bond, or the like.

In an exemplary embodiment, the functional group may include at least one of a carboxyl group, a phosphate group, a phosphonate group, a sulfonate group, a (meth)acrylate group, an acid anhydride group, an epoxy group, a glycidyl group, an oxazoline group, a hydroxyl group, an amine group, an amide group, a carbonyl group, an isocyanate group, an acyl group, and a carbodiimide group, or a combination thereof, but is not limited thereto.

In addition, a polymer having the functional group may include, for example, at least one of a polyolefin having the functional group at one end of the main chain thereof, for example, both ends thereof, a copolymer of polyolefin having the functional group with another polymer, a polyolefin having the functional group grafted to the main chain thereof, for example, a polyethylene having the functional group grafted to the main chain thereof, a polystyrene having the functional group grafted thereto, a polyester having the functional group grafted thereto, a thermoplastic elastomer having the functional group grafted at one end or both ends of the main chain thereof, a copolymer of the above listed polymer with another polymer, or a combination thereof, but is not limited thereto.

In an example embodiment, the compatibilizer may include a polymer or a copolymer comprising a carboxyl group, a phosphate group, a phosphonate group, a (meth)acrylate group, a maleic anhydride group, or a glycidyl (meth)acrylate group at one end of the main chain thereof, for example, at both ends thereof the main chain thereof, or grafted to the main chain thereof, and in an exemplary embodiment, a polyethylene having the functional group grafted thereto. In an exemplary embodiment, the grafting may be formed by a (meth)acrylate or glycidyl(meth)acrylate.

The compatibilizer may be included in an amount of less than about 3 wt %, for example, from about 0.1 wt % to about 2.7 wt %, for example, from about 0.1 wt % to about 2.5 wt %, for example, from about 0.1 wt % to about 2.3 wt %, for example, from about 0.1 wt % to about 2.0 wt %, for example, from about 0.3 wt % to about 2.0 wt %, for example, from about 0.5 wt % to about 2.0 wt %, for example, from about 0.5 wt % to about 1.7 wt %, for example, from about 0.5 wt % to about 1.5 wt %, or for example, from about 0.5 wt % to about 1 wt %, based on a total weight of the composite, but is not limited thereto. As shown in the Examples and Comparative Examples, when the compatibilizer is included in an amount of greater than or equal to about 3 wt % based on a total weight of the composite, a battery case including the same may have no impact strength improvement effect or a slight reduction in impact strength.

The battery case according to an embodiment includes an inorganic moisture absorbent and less than about 3 wt % of a compatibilizer for promoting compatibility between the inorganic moisture absorbent and the polymer matrix, and thus may have similar moisture transmission resistivity, but may have substantially improved impact strength compared with a battery case that includes the polymer matrix and the inorganic moisture absorbent, but does not include the compatibilizer. In an exemplary embodiment, an article obtained by molding a composite including 90 wt % of high density polyethylene (HDPE) and 10 wt % of CaO as an inorganic moisture absorbent as described in detail in the Examples shows a water vapor transmission rate of about 0.010 g/m$^2$/day and an impact strength of about 21.2 kJ/m$^2$, but an article obtained by molding a composite including about 89.5 wt % of high density polyethylene (HDPE), about 10 wt % of CaO, and about 0.5 wt % of a compatibilizer shows an similar water vapor transmission rate of about 0.011 g/m$^2$/day but a substantially increased impact strength from about 34.7 kJ/m$^2$ to about 42.6 kJ/m$^2$. In other words, compared with the article obtained by molding a composite including a polymer matrix and an inorganic moisture absorbent alone, the article obtained by molding a composite that includes a compatibilizer, as a polymer matrix and an inorganic moisture absorbent in each equal amounts shows substantially improved impact strength ranging from at least about 60% to about 200%, while maintaining an similar water vapor transmission rate.

Accordingly, a battery case including the article of a composite including a polymer matrix, an inorganic moisture absorbent, and less than about 3 wt % of a compatibilizer for promoting compatibility between the polymer matrix and the inorganic moisture absorbent according to an embodiment may be easily fabricated to have a desired shape and a desired size, as well as, similar moisture transmission resistivity and mechanical properties to those of a conventional metal-based battery case, such as including aluminum, and accordingly, may be advantageously used to fabricate a battery or battery module requiring moisture transmission resistivity and mechanical properties.

In an exemplary embodiment, the composite may further include a fluorinated polymer.

When the composite includes a fluorinated polymer of polytetrafluoroethylene (PTFE), polyvinylidene fluoride (PVDF), polychlorotrifluoroethylene (PCTFE), a mixture thereof, a copolymer, or a combination thereof as the base polymer, a water vapor transmission rate of the container of the battery case fabricated therefrom may be further improved.

The fluorinated polymer has hydrophobicity, and thus when the fluorinated polymer is included in an amount of about 20 wt %, for example, less than or equal to about 15 wt %, for example, less than or equal to about 10 wt %, for example, from about 3 wt % to about 10 wt %, for example, from about 5 wt % to about 10 wt %, based on a total weight of the composite, an article fabricated therefrom may have a barrier effect to block moisture from the surface of the article contacting the air.

The composite may further include materials known to be suitable as moisture barrier materials. Such a moisture barrier material may include, for example, a crystal of a polymer that is the same as or different from the polymer matrix, an inorganic material particle different from the inorganic moisture absorbent, or a fiber-shaped material, such as a glass fiber or a carbon fiber, or a combination thereof in the composite. Specific examples of the moisture barrier material may include wollastonite, mica, whisker, barium sulfate, kaolin, talc, nanoclay, a carbon fiber or a glass fiber having an aspect ratio of greater than or equal to about 100, or a mixture thereof, but are not limited thereto.

The battery case may be a battery case for a rechargeable lithium battery, but is not limited thereto, and may be a case for a battery housing a plurality of electrode assemblies and having moisture transmission resistivity.

In an exemplary embodiment, the battery case may further include, for example, a lid configured to cover at least one part of the open side of the container and having at least one of a positive terminal and a negative terminal. The lid may have at least one of a positive terminal and a negative electrode terminal, for example, both of the positive terminal and the negative electrode terminal. The lid may include the same material as the container or the lid may include a different material from the container.

Hereinafter, a battery case according to an embodiment is described with reference to the appended drawings.

FIG. 1 is an exploded perspective view of an exemplary embodiment of a battery case.

Referring to FIG. 1, a battery case according to an exemplary embodiment includes a container 1 including a bottom wall 2 and a plurality of (e.g., 3, 4, or greater) side walls 3a, 3b, 3c, and 3d that are integrated to provide a space for housing an electrode assembly. The container 1 has an open side opposed to the bottom wall 2 and an electrode assembly may be housed in the container 1 through the open side.

Herein, "integrated" indicates a state wherein the bottom wall is connected to the plurality of side walls, and thus all the other sides except for the open side provide a closed and sealed space. A method for this integration is not particularly limited but may include, for example, a method of molding the composite including the base polymer and the inorganic moisture absorbent, as described below, into a container having a space for housing electrodes by integrating the bottom wall with the plurality of side walls or a method of separately molding the bottom wall and the plurality of side walls and then, connecting them in a known method such as welding, boning, or the like. As described above, the method for integration is not limited to a particular method but may include various suitable methods, through which a container of a battery case is fabricated to have a space for housing an electrode assembly by integrating the bottom wall and the plurality of side walls.

The battery case may further include a lid 4 to close (e.g., seal) at least one part, for example, the entire top opening of the container 1. The lid 4 may have at least one of a positive terminal 5a and a negative terminal 5b. The lid 4 may include the same material as the container 1 or a different material from the container 1 and the battery case according to an exemplary embodiment may be entirely sealed by covering the open side of the container 1 with the lid 4 and sealing the same.

Figure 2:
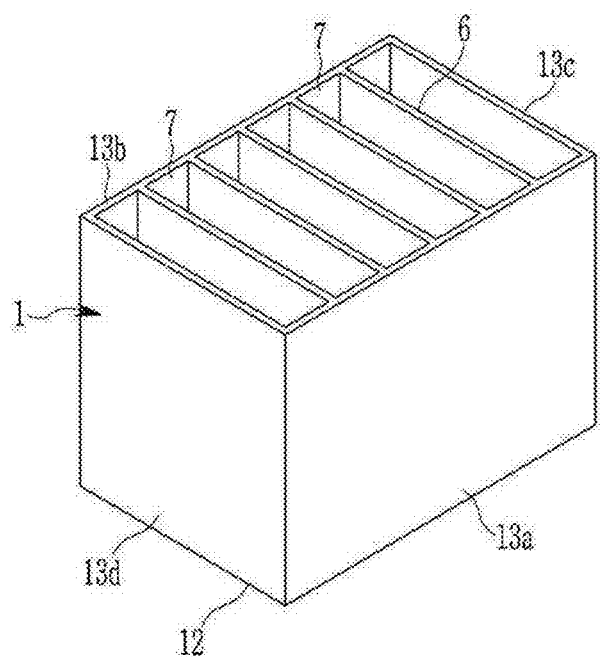
FIG. 2 is an exploded perspective view showing an exemplary embodiment of a battery case.

FIG. 2 is an exploded perspective view of another exemplary embodiment of a battery case.

Referring to FIG. 2, a container 1 of a battery case according to an exemplary embodiment has a space formed by integrating a bottom wall 12 with a plurality of side walls (e.g., 3, 4, or more) 13a, 13b, 13c, and 13d and an open side facing the bottom wall 12, and in the space, at least one partition wall 6 (e.g., 2, 3, 4, 5, or more) is provided. Accordingly, the container may include a plurality of (e.g., greater than or equal to 2, for example, greater than or equal to 3, for example, greater than or equal to 4, or for example, greater than or equal to 5) battery cell compartments 7 by the partition wall 6. Each battery cell compartment 7 may include the electrode assembly that will be described later (for example, the electrode assembly may comprise a positive electrode 8a and a negative electrode 8b), and a battery module may be fabricated by housing at least two electrode assemblies in each battery cell compartment and injecting an electrolyte solution therein. After disposing the electrode assembly and injecting the electrolyte solution, the open side of the container 1 may be closed or sealed with a lid, which is not shown.

Although FIGS. 1 and 2 show exemplary embodiments of the container 1 of the battery case having a rectangular parallelepiped shape, the battery case may have various shapes and sizes not shown.

Another embodiment provides a battery including the battery case and an electrode assembly housed in the container of the battery case and including a positive electrode and a negative electrode. The battery case is the same as described above.

The electrode assembly includes a positive electrode, a negative electrode, and a separator disposed therebetween. The electrode assembly may further include, for example an aqueous or non-aqueous electrolyte solution in the separator. The type of electrode assembly is not particularly limited. In an embodiment, the electrode assembly may include an electrode assembly for a rechargeable lithium battery. The positive electrode, the negative electrode, the separator, and the electrolyte solution of the electrode assembly may be desirably selected and are not particularly limited. Hereinafter, the electrode assembly for a rechargeable lithium battery is exemplified but the present disclosure is not limited thereto.

The positive electrode may include, for example, a positive active material disposed on a positive current collector and may further include at least one of a conductive material and a binder. The positive electrode may further include a filler. The negative electrode may include, for example a negative active material disposed on a negative current collector and may further include at least one of a conductive material and a binder. The negative electrode may further include a filler.

The positive active material may include, for example a (solid solution) oxide including lithium but is not particularly limited as long as it is a material capable of intercalating and deintercalating lithium ions electrochemically. The positive active material may be a layered compound such as lithium cobalt oxide ($LiCoO_2$), lithium nickel oxide ($LiNiO_2$), and the like, a compound substituted with one or more transition metal; a lithium manganese oxide such as chemical formulae $Li_{1+x}Mn_{2-x}O_4$ (wherein, x is 0 to 0.33), $LiMnO_3$, $LiMn_2O_3$, $LiMnO_2$, and the like; lithium copper oxide ($Li_2CuO_2$), vanadium oxide such as $LiV_3O_8$, $LiFe_3O_4$, $V_2O_5$, $Cu_2V_2O_7$, and the like; a Ni site-type lithium nickel oxide represented by chemical formula $LiNi_{1-x}M_xO_2$ (wherein, M=Co, Mn, Al, Cu, Fe, Mg, B, or Ga and x=0.01 to 0.3); a lithium manganese composite oxide represented by chemical formula $LiMn_{2-x}M_xO_2$ (wherein, M=Co, Ni, Fe, Cr, Zn, or Ta and x=0.01 to 0.1) or $Li_2Mn_3MO_8$ (wherein, M=Fe, Co, Ni, Cu, or Zn); $LiMn_2O_4$ where a part of Li of chemical formula is substituted with an alkaline-earth metal ion; a disulfide compound; $Fe_2(MoO_4)_3$, and the like, or a combination thereof, but is not limited thereto.

Examples of the conductive material may be carbon black such as ketjen black, acetylene black, and the like, natural graphite, artificial graphite, and the like, but is not particularly limited as long as it may increase conductivity of the positive electrode.

The binder may be for example, a polyvinylidene fluoride, an ethylene-propylene-diene terpolymer, a styrene-butadiene rubber, an acrylonitrile-butadiene rubber, a fluorine rubber, a polyvinyl acetate, a polymethyl methacrylate, a polyethylene, a nitrocellulose, and the like, or a combination thereof, but is not particularly limited as long as it may bind the (positive or negative) active material and the conductive material on the current collector. Examples of the binder may be a polyvinyl alcohol, a carboxylmethyl cellulose (CMC), a starch, a hydroxypropyl cellulose, a recycled cellulose, a polytetrafluoroethylene, a polyethylene, a polypropylene, an ethylene-propylene-diene polymer (EPDM), a sulfonated EPDM, a styrene butadiene rubber, a fluorine rubber, various copolymers thereof, a polymeric highly saponified polyvinyl alcohol, and the like, in addition to the foregoing materials.

The negative active material may be for example, carbon and graphite materials such as natural graphite, artificial graphite, expanded graphite, carbon fiber, non-graphitizable carbon, carbon black, carbon nanotube, fullerene, activated carbon, and the like; a metal such as Al, Si, Sn, Ag, Bi, Mg, Zn, In, Ge, Pb, Pd, Pt, Ti, and the like that may be an alloy with lithium and a compound including such an element; a composite material of a metal and a compound thereof and carbon and graphite materials; a lithium-containing nitride, and the like, or a combination thereof. Among them, carbon-based active materials, silicon-based active materials, tin-based active materials, or silicon-carbon-based active materials may be desirably used and may be used alone or in a combination of two or more.

The separator is not particularly limited and may be any separator of a rechargeable lithium battery. For example, a porous film or non-woven fabric having excellent high rate discharge performance may be used alone or in a mixture thereof. The separator may include pores and the pores may have generally a pore diameter of about 0.01 μm to about 10 μm and a thickness of about 5 μm to about 300 μm. A substrate of the separator may include, for example, a polyolefin, a polyester, a polyvinylidene fluoride (PVDF), a vinylidene fluoride-hexafluoropropylene copolymer, a vinylidene fluoride-perfluorovinylether copolymer, a vinylidene fluoride-tetrafluoroethylene copolymer, a vinylidene fluoride-trifluoroethylene copolymer, a vinylidene fluoride-fluoroethylene copolymer, a vinylidene fluoride-hexafluoroacetone copolymer, a vinylidene fluoride-ethylene copolymer, a vinylidene fluoride-propylene copolymer, a vinylidene fluoride-trifluoropropylene copolymer, a vinylidene fluoride-tetrafluoroethylene-hexafluoropropylene copolymer, a vinylidene fluoride-ethylene-tetrafluoroethylene copolymer, and the like, or a combination thereof. When the electrolyte is a solid electrolyte such as a polymer, the solid electrolyte may function as a separator.

The conductive material is a component to further improve conductivity of an active material and may be included in an amount of about 1 wt % to about 30 wt % based on a total weight of the electrode, but is not limited thereto. Such a conductive material is not particularly limited as long as it does not cause chemical changes of a battery and has conductivity, and may be for example, graphite such as natural graphite or artificial graphite; carbon black such as carbon black, acetylene black, ketjen black, channel black, furnace black, lamp black, summer black, and the like; a carbon derivative such as carbon nanotube, fullerene, and the like, a conductive fiber such as a carbon fiber or a metal fiber, and the like; carbon fluoride, a metal powder such as aluminum, a nickel powder, and the like; a conductive whisker such as zinc oxide, potassium titanate, and the like; a conductive metal oxide such as a titanium oxide; a conductive material such as a polyphenylene derivative, and the like, or a combination of the foregoing.

The filler is an auxiliary component to suppress expansion of an electrode and is not particularly limited as long as it does not cause chemical changes of a battery and is a fiber-shaped material, and may be for example, an olefin-based polymer such as a polyethylene, a polypropylene, and the like; a fiber-shaped material such as a glass fiber, a carbon fiber, and the like, or a combination thereof.

In the electrode, the current collector may be a site where electron transports in an electrochemical reaction of the active material and may be a negative current collector and a positive current collector according to kinds of the electrode. The negative current collector may have a thickness of about 3 μm to about 500 μm. The negative current collector is not particularly limited as long as it does not cause chemical changes of a battery and has conductivity and may be, for example, copper, stainless steel, aluminum, nickel, titanium, fired carbon, copper or stainless steel that is surface-treated with carbon, nickel, titanium, silver, or the like, an aluminum-cadmium alloy, and the like.

The positive current collector may have a thickness of about 3 μm to about 500 μm, but is not limited thereto. Such a positive current collector is not particularly limited as long as it does not cause chemical changes of a battery and has high conductivity and may be, for example, stainless steel, aluminum, nickel, titanium, fired carbon, or aluminum or stainless steel that is surface-treated with carbon, nickel, titanium, silver, or the like.

The current collectors may have a fine concavo-convex structure on its surface to reinforce a binding force of the active material and may be used in various shapes of a film, a sheet, a foil, a net, a porous film, a foam, a non-woven fabric, or the like.

The lithium-containing non-aqueous electrolyte solution may consist of a non-aqueous electrolyte and a lithium salt.

The non-aqueous electrolyte may be, for example, an aprotic organic solvent such as N-methyl-2-pyrrolidinone, propylene carbonate, ethylene carbonate, butylene carbonate, dimethyl carbonate, diethyl carbonate, gamma-butyrolactone, 1,2-dimethoxy ethane, tetrahydroxy franc, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, a dioxolane derivative, sulfolane, methyl sulfolane, 1,3-dimethyl-2-imidazolidinone, a propylene carbonate derivative, a tetrahydrofuran derivative, ether, methyl propionate, ethyl propionate, and the like, or a combination thereof.

The lithium salt is a material that is dissolved in the non-aqueous electrolyte solution and may be, for example, LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSb$_F$, LiAlCl$_4$, CH$_3$SO$_3$Li, CF$_3$SO$_3$Li, (CF$_3$SO$_2$)$_2$NLi, lithium chloro borane, lower aliphatic lithium carbonate, lithium-4-phenyl borate, imide, and the like, or a combination thereof.

An organic solid electrolyte, an inorganic solid electrolyte, and the like may be used as needed.

The organic solid electrolyte may be, for example, a polyethylene derivative, a polyethylene oxide derivative, a polypropylene oxide derivative, a phosphoric acid ester polymer, a polylysine, a polyester sulfide, a polyvinyl alcohol, a polyvinylidene fluoride, a polymer including an ionic leaving group, and the like, or a combination thereof.

The inorganic solid electrolyte may be, for example, nitrides of Li such as Li$_3$N, LiI, Li$_5$NI$_2$, Li$_3$N—LiI—LiOH, LiSiO$_4$, LiSiO$_4$—LiI—LiOH, Li$_2$SiS$_3$, Li$_4$SiO$_4$, Li$_4$SiO$_4$—LiI—LiOH, Li$_3$PO$_4$—Li$_2$S—SiS$_2$, and the like, halides, sulfates, and the like, or a combination thereof.

The non-aqueous electrolyte solution may include, for example, pyridine, triethylphosphite, triethanolamine, cyclic ether, ethylene diamine, n-glyme, hexamethylphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride, or a combination thereof, in order to improve charge and discharge characteristics, flame retardancy, and the like. As needed, in order to endow flame resistance, a halogen-containing solvent such as carbon tetrachloride, ethylene trifluoride, and the like may be further added and in order to improve high temperature storage characteristics. Carbon dioxide gas may be further added.

As described above, a battery including a battery case according to an embodiment avoids manufacture of a unit cells that include exterior materials consisting of additional moisture transmission resistivity materials on each electrode assembly, and thus an electrode assembly housed in the container of the battery case avoids use of additional exterior materials.

Another embodiment provides a method of fabricating a battery including: molding a composite including a polymer matrix and an inorganic moisture absorbent dispersed therein to prepare a battery case including a container configured to house an electrode assembly, and having a water vapor transmission rate (WVTR) of less than about 0.05 g/m$^2$/day, when measured at 38° C. and a relative humidity of 100% according to ISO 15106 or ASTM F1249; housing the electrode assembly including a positive electrode and a negative electrode in the container of the battery case; and injecting an electrolyte solution in the container including the electrode assembly.

The composite including the polymer matrix and the inorganic moisture absorbent may be easily molded into a battery case having a desirable size and shape according to an embodiment by various suitable molding methods, for example, extrusion molding, injection molding, blow molding, press molding, and the like.

The battery fabricating method avoids metal exterior material and thus includes a simplified process for easy and fast fabrication of a battery or a battery module.

Particularly, the battery case may be fabricated to include at least two battery cell compartments having a desired size with a desired number of electrode assembles by forming at least one partition wall in the space of the battery container, and accordingly, a desired number of electrode assemblies having a desired size can be introduced into at least two battery cell compartments without being wrapped with an additional metal pouch and the like, thus allowing free fabrication of a battery module including a desired number of electrode assemblies. This battery module may become lighter in terms of total weight due to the lighter weight of the battery case and may show improved energy efficiency.

Hereinafter, the embodiments are described with reference to examples and comparative examples. The following examples and comparative examples are exemplary but do not limit the scope of the present disclosure.

Example: Preparation of Composition for Battery Case and Measurement of Water Vapor Transmission Rate of Article High density polyethylene (HDPE) having a weight average molecular weight of greater than or equal to about $10^5$ g/mol as a base polymer, zeolite (an average particle size: 3 μm) (COLITE-P, Cosmo Fine Chemicals) as an inorganic moisture absorbent, and in addition, calcium oxide (CaO, an average particle size: 3 μm, ANFOGEN #600H, Hwasung Chemical Co., Ltd.), a copolymer having an acidic functional group (BYK P4101, BYK Additives & Instruments Company), a copolymer having a carboxyl group (BYK P4102, BYK Additives & Instruments Company), PE-g-MA (methacrylate-grafted polyethylene (containing 0.5 wt % of methacrylate (MA), Sigma-Aldrich Co., Ltd.), and PE-g-GMA (glycidyl methacrylate-grafted polyethylene (containing 8 wt % of glycidyl methacrylate (GMA), Sigma-Aldrich Co., Ltd.) as a compatibilizer are prepared.

These components are mixed in a ratio shown in Table 1, the mixtures are respectively injection-molded, and then, a water vapor transmission rate and impact strength of each article obtained therefrom are measured and shown in Table 1.

Specifically, the components shown in Table 1 are charged in an extruder including two screw axes, and then, melted and mixed to manufacture each pellet. The temperature of the extruder is controlled to have six zones from 160° C. at an inlet to 240° C. at an outlet, and a screw speed is in a range of 60 to 100 rpm. The pellet is placed in an injector to manufacture a disk-shaped article having a thickness of about 1 mm and a diameter of about 30 mm. A water vapor transmission rate of each article at 38° C. under relative humidity of 100% is measured by using an AQUATRAN water vapor permeation instrument (Mocon Inc.) according to ISO15106-3. In addition, Notched type Izod impact strength of the article is measured by using an Instron impact pendulum (Impactor II, CEAST 9050) according to ASTM D265.

On the other hand, as for a control group, impact strength of a high density polyethylene polymer that does not include an inorganic moisture absorbent or a compatibilizer is measured, and the result is shown in Table 1.

TABLE 1

|  | HDPE (wt %) | Inorganic moisture absorbent (wt %) | | Type and amount of compatibilizer (wt %) | | | | Impact strength (kJ./m²) | Water vapor transmission rate (g/m²/day) |
| --- | --- | --- | --- | --- | --- | --- | --- | --- | --- |
|  |  | CaO | Zeolite | BYK P4101 | BYK P4102 | PE-g-MA | PE-g-GMA |  |  |
| Example 1 | 89.5 | 10 | 0 | 0.5 | — | — | — | 42.6 | — |
| Example 2 | 89.5 | 10 | 0 | — | 0.5 | — | — | 40.2 | 0.011 |
| Example 3 | 89.5 | 10 | 0 | — | — | 0.5 | — | 36.9 | — |
| Example 4 | 89.5 | 10 | 0 | — | — | — | 0.5 | 34.7 | — |
| Comparative Example 1 | 90 | 10 | 0 | — | — | — | — | 21.2 | 0.010 |
| Example 5 | 89.5 | 0 | 10 | 0.5 | — | — | — | 40.3 | — |
| Example 6 | 89.5 | 0 | 10 | — | 0.5 | — | — | 41.2 | 0.012 |
| Comparative Example 2 | 90 | 0 | 10 | — | — | — | — | 26.3 | 0.013 |
| Comparative Example 3 | 87 | 10 | 0 | — | — | 3 | — | 17.0 | — |
| Comparative Example 4 | 70 | 30 | 0 | — | — | — | — | 16.0 | 0.019 |
| Example 7 | 69 | 30 | 0 | 1 | — | — | — | 25.3 | — |
| Example 8 | 69 | 30 | 0 | — | 1 | — | — | 30.0 | 0.017 |
| Comparative Example 5 | 65 | 30 | 0 | — | — | — | 5 | 11.8 | — |
| Comparative Example 6 | 95 | 5 | 0 | — | — | — | — | 32.4 | 0.012 |
| Example 9 | 94.5 | 5 | 0 | — | 0.5 | — | — | 33.6 | 0.013 |
| Control | 100 | — | — | — | — | — | — | 50.0 | 0.4 |

As shown in Table 1, articles obtained by molding the composites (Examples 1 to 9) that include a polymer matrix, an inorganic moisture absorbent, and less than 3 wt % of a compatibilizer according to an embodiment show similar water vapor transmission rates but substantially improved impact strengths, which may be different depending on a type of the compatibilizer, compared with the articles obtained by molding the composites that include only the polymer matrix and the inorganic moisture absorbent in each equal amounts (Comparative Examples 1, 2, 4 and 6).

However, an article that includes 3 wt % of a compatibilizer as shown in Comparative Example 3 shows rather low impact strength compared with the articles that do not include the compatibilizer, such as, for example, the polymer matrix and the inorganic moisture absorbent alone according to Comparative Examples 1 and 2. Likewise, Comparative Example 5 that includes 5 wt % of a compatibilizer shows substantially decreased impact strength compared with Comparative Example 3 that includes the inorganic moisture absorbent in an equal amount but not the compatibilizer, as well as compared with Examples 7 and 8 that include an inorganic moisture absorbent in an equal amount and 1 wt % of the compatibilizer.

Example 9 and Comparative Example 6 include 5 wt %, a small amount of the inorganic moisture absorbent, but show substantially improved moisture transmission resistivity compared with the control group that does not include the inorganic moisture absorbent at all. However, both of them show a slight decrease in impact strength, but Example 6, which includes 0.5 wt % of the compatibilizer shows an improved impact strength compared with Comparative Example 6 that does not include a compatibilizer at all.

On the other hand, Comparative Examples 4 and 5 and Examples 7 and 8 include 30 wt % of the inorganic moisture absorbent, show improved moisture transmission resistivity compared with the control group, that includes no inorganic moisture absorbent, but an improved water vapor transmission rate and thus decreased moisture transmission resistivity compared with those Examples that include 5 wt % or 10 wt % of the inorganic moisture absorbent. While not wishing to be bound by theory, the reason could be that as an amount of the inorganic moisture absorbent increases beyond 20 wt %, the inorganic moisture absorbent itself is agglomerated and becomes hydrophilic and thus deteriorates moisture transmission resistivity.

On the other hand, in Table 1, although water vapor transmission rates of Examples 1, 3, and 4 were not measured, because Examples 1, 3, and 4 include the same amount of and the same type of the polymer matrix, the inorganic moisture absorbent, and in addition, the same amount of a compatibilizer as those of Example 2, they are expected to have substantially similar water vapor transmission rates to that of Example 2, with minor variations, depending on the kind of the compatibilizer. Although water vapor transmission rate Example 5 was not measured, Example 5 includes the same amounts of the polymer matrix and the inorganic moisture absorbent as Example 6, and in addition, the same amount and the same type of a compatibilizer as those of Example 6, and thus is expected to have a substantially similar water vapor transmission rate to that of Example 6, with minor variation, depending on a kind of the compatibilizer. Likewise, Example 7 is expected to have a substantially similar water vapor transmission rate to that of Example 8.

On the other hand, an article according to the control group including neither the inorganic moisture absorbent nor the compatibilizer but only the polymer matrix showed the highest impact strength but a substantially lower water vapor transmission rate, and thus may not be used for a battery case and the like.

As shown hereinbefore, an article molded by using a composite including a polymer matrix, an inorganic moisture absorbent dispersed therein, and a compatibilizer in an amount of less than 3 wt % based on a total amount of the composite maintains an substantially similar water vapor transmission rate to that of an article including the polymer matrix and the inorganic moisture absorbent alone and shows substantially increased mechanical properties, such as, for example, an impact strength, as well as has excellent moisture transmission resistivity. Accordingly, a battery case including the article according to an embodiment may be applied to a battery case and the like where high moisture transmission resistivity and good mechanical properties are desired, and wherein the battery case can be economically and easily fabricated to have a desired size and shape. Thus, advantageously the battery case according to an embodiment may be used to form a battery module as an energy source for a device such as an electric vehicle with which electricity is supplied from a plurality of electrochemical devices.

While this disclosure has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims.

What is claimed is:

1. A battery comprising
a battery case comprising a container housing an electrode assembly,
wherein
the container comprises a bottom wall and a plurality of side walls,
the bottom wall and the side walls are integrated to define a space for housing the electrode assembly and an open side opposed to the bottom wall,
each of the bottom wall and the plurality of side walls is formed of a composite comprising a polymer matrix, an inorganic moisture absorbent dispersed in the polymer matrix, and a compatibilizer, and
the composite defines inner and outer surfaces of the bottom wall and inner and outer surfaces of the plurality of side walls,
wherein the compatibilizer promotes compatibility between the polymer matrix and the inorganic moisture absorbent,
wherein the compatibilizer comprises a polymer having at least one functional group reacted with the inorganic moisture absorbent or adhered to the inorganic moisture absorbent,
wherein the polymer having the at least one functional group comprises a polyolefin, a polystyrene, a polyester, a thermoplastic elastomer, a copolymer thereof, or a combination thereof, and
the at least one functional group is attached to an end of the polymer, grafted to the main chain of the polymer, or a combination thereof,
wherein the compatibilizer is present in an amount of less than or equal to about 2 wt % based on a total weight of the composite, and
wherein at least one of the bottom wall and the plurality of side walls at a thickness of 1 millimeter has a water vapor transmission rate of less than about 0.07 $g/m^2/$day, when measured at 38° C. and a relative humidity of 100% according to ISO 15106 or ASTM F1249.

2. The battery of claim 1, wherein the container further comprises a partition wall extending from a first side wall to an opposite second side wall.

3. The battery of claim 1, wherein the battery case further comprises a lid configured to cover a part of the open side of the container, and wherein the lid comprises at least one of a positive terminal and a negative terminal.

4. The battery of claim 3, wherein the lid comprises the composite.

5. The battery of claim 1, wherein the polymer matrix comprises a polycarbonate, a polyethylene, a polypropylene, a polyvinyl chloride, a polyvinyl acetate, a polyvinyl alcohol, a polyacrylonitrile, a polyamide, a polyester, a polyphenylene sulfide, a polyphenylene ether, a polyphenylene oxide, a polystyrene, a polyamide, a polycyclic olefin copolymer, an acrylonitrile-butadiene-styrene copolymer, a liquid crystal polymer, a mixture thereof, an alloy thereof, a copolymer thereof, or a combination thereof.

6. The battery of claim 1, wherein the inorganic moisture absorbent comprises silica gel, zeolite, CaO, BaO, $MgSO_4$, $Mg(ClO_4)_2$, MgO, $P_2O_5$, $Al_2O_3$, $CaH_2$, NaH, $LiAlH_4$, $CaSO_4$, $Na_2SO_4$, $CaCO_3$, $K_2CO_3$, $CaCl_2$), $Ba(ClO_4)_2$, Ca, or a combination thereof.

7. The battery of claim 1, wherein the functional group comprises a carboxyl group, a phosphate group, a phosphonate group, a sulfonate group, a (meth)acrylate group, an acid anhydride group, an epoxy group, a glycidyl group, an oxazoline group, a hydroxyl group, an amine group, an amide group, a carbonyl group, an isocyanate group, an acyl group, a carbodiimide group, or a combination thereof.

8. The battery of claim 1, wherein an amount of the inorganic moisture absorbent is less than or equal to about 20 wt % based on a total weight of the composite.

9. The battery of claim 1, wherein the polymer matrix comprises a polyolefin, a liquid crystal polymer, or a combination thereof.

10. The battery of claim 9, wherein the polyolefin comprises a high density polyethylene.

11. The battery of claim 9, wherein the liquid crystal polymer comprises a structural unit derived from an oligomer of hydroxybenzoic acid.

12. The battery of claim 1, wherein the composite further comprises a fluorinated polymer comprising polytetrafluoroethylene, polyvinylidene fluoride, polychlorotrifluoroethylene, a mixture thereof, a copolymer thereof, or a combination thereof.

13. The battery of claim 1, wherein the inorganic moisture absorbent comprises CaO, zeolite, or a mixture thereof.

14. The battery of claim 1, wherein the electrode assembly comprises a positive electrode and a negative electrode.

15. The battery of claim 1, wherein the electrode assembly does not include a metal case.

16. The battery of claim 1, wherein the electrode assembly is for a rechargeable lithium battery.

* * * * *